T. S. SMITH.

Thill-Couplings.

No. 5,869. Reissued May 12, 1874.

WITNESSES:

P. C. Dieterich.

Fred. Kiesicher

INVENTOR.

T. S. Smith per T. H. Alexander

ATTORNEY.

AM. PHOTO-LITHOGRAPHIC Co. N.Y. (OSBORNE'S PROCESS.)

UNITED STATES PATENT OFFICE.

T. S. SMITH, OF NEW HAVEN, CONNECTICUT, ASSIGNOR, BY MESNE ASSIGNMENTS, TO HORACE B. KINNEY, OF LEONARDSVILLE, NEW YORK.

IMPROVEMENT IN THILL-COUPLINGS.

Specification forming part of Letters Patent No. 59,728, dated November 13, 1866; reissue No. 5,869, dated May 12, 1874; application filed March 31, 1874.

*To all whom it may concern:*

Be it known that I, T. S. SMITH, of New Haven, in the county of New Haven and State of Connecticut, have invented certain new and useful Improvements in Carriage-Shackles; and I do hereby declare the following to be a full, clear, and exact description thereof, reference being had to the accompanying drawing and to the letters of reference marked thereon.

The nature of my invention consists in adapting a ball-and-socket joint to carriage-shackles, and in the combination therewith of an elastic material placed between the top of the cap and the bottom of the socket, for the purpose of compensating for the wear of the ball and keeping the same from rattling in the socket.

In order to enable others skilled in the art to which my invention appertains to make and use the same, I will now proceed to describe its construction and operation, referring to the annexed drawing, which forms a part of this specification, and in which—

Figure 1:
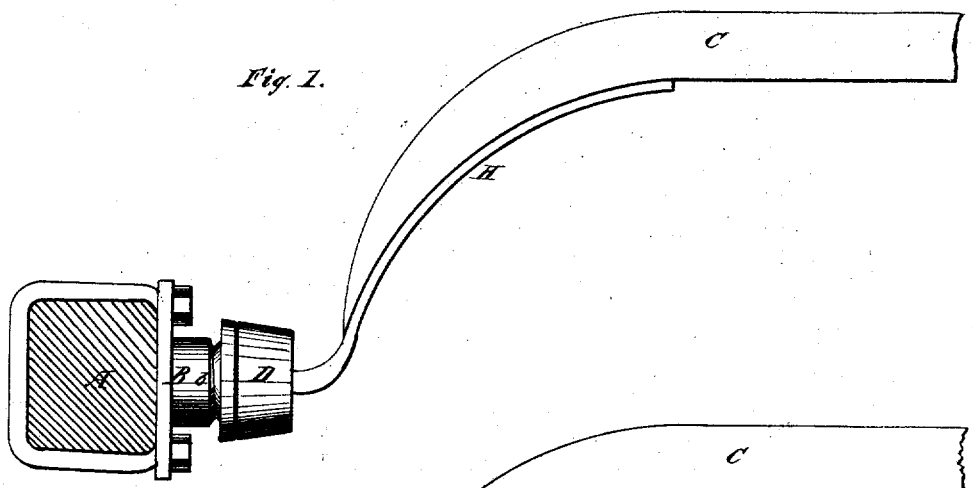
Figure 2:
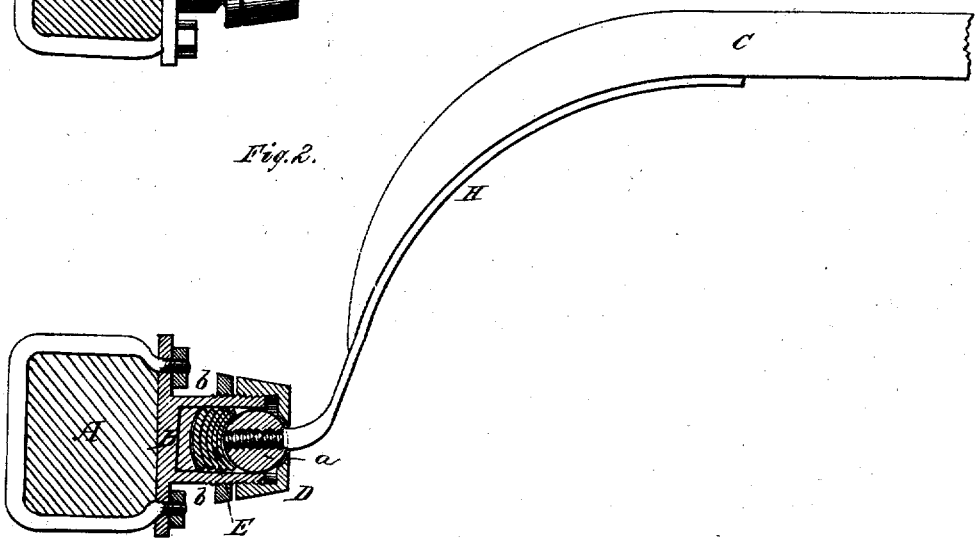

Figure 1 is a side elevation of a carriage-shackle embodying my invention, and Fig. 2 is a longitudinal section of the same.

A represents the axle, and B a plate formed so as to be secured thereto in any convenient manner, represented in the drawing as being secured by a strap passing around the axle. On this plate B is formed the socket *b*, to receive the ball *a*, which is confined therein by means of a cap, D, screwed on the outside of the socket *b*. Between the cap D and the bottom of the socket *b*, preferably beneath the ball *a*, is placed an elastic material, E, which forms a spring-packing to impart a yielding pressure to the ball. The cap D may be secured in position by a jam-nut or other device. To the ball *a* is fixed a strap or thill-iron, H, to which the shafts or pole C is attached.

By this arrangement the shafts or pole may be raised or lowered in the usual manner, and any irregular strain which is brought upon the shackle does not interfere with the proper working of the shackle; and the ball being packed, as before described, prevents rattling, and, being entirely covered, is not in the least injured or interfered with by mud or other foreign substance.

To detach the shafts or pole from the carriage, loosen the jam-nut and remove the cap, which releases the ball from the socket; or reverse the operation to attach the shafts or pole.

Having thus fully described my invention, what I claim, and desire to secure by Letters Patent, is—

1. The combination, with a ball and socket, of a screw-cap and an elastic material for imparting a yielding pressure to the ball, substantially as and for the purpose set forth.

2. The combination, with thills C, thill-iron H, and ball *a*, of socket *b*, screw-cap D, and spring-packing E, substantially as and for the purpose described.

3. The combination, with axle A and a shackle formed with a socket, of ball *a*, screw-cap D, thill-iron H, and an elastic material, to impart a yielding pressure to the ball and prevent it from rattling in the socket, substantially as set forth.

4. The ball-and-socket joint provided with a packing, E, strap H, and plate B, all combined substantially for the purpose set forth.

In testimony that I claim the above I set my hand in presence of two witnesses.

T. S. SMITH.

Witnesses:
JOHN E. EARLE,
A. J. TIBBITS.